US009133040B2

(12) United States Patent
Jung et al.

(10) Patent No.: US 9,133,040 B2
(45) Date of Patent: Sep. 15, 2015

(54) METHOD FOR $MN_3O_4$ NANOPARTICLES BY SOLID-STATE DECOMPOSITION OF EXFOLIATED $MNO_2$ NANOSHEET

(75) Inventors: Hyun Jung, Seoul (KR); Na-ra Lee, Gyeonggi-do (KR)

(73) Assignee: Dongguk University Industry-Academic Cooperation Foundation (KR)

( * ) Notice: Subject to any disclaimer, the term of this patent is extended or adjusted under 35 U.S.C. 154(b) by 778 days.

(21) Appl. No.: 13/477,911

(22) Filed: May 22, 2012

(65) Prior Publication Data

US 2013/0108542 A1    May 2, 2013

(30) Foreign Application Priority Data

Oct. 28, 2011    (KR) .................. 10-2011-0111230

(51) Int. Cl.
*C01G 45/02* (2006.01)
*B82Y 30/00* (2011.01)
*B01J 37/03* (2006.01)
*B01J 23/34* (2006.01)
*B01J 35/00* (2006.01)
(Continued)

(52) U.S. Cl.
CPC .................. *C01G 45/02* (2013.01); *B01J 23/34* (2013.01); *B01J 35/002* (2013.01); *B01J 35/006* (2013.01); *B01J 35/0013* (2013.01); *B01J 37/031* (2013.01); *B82Y 30/00* (2013.01); *H01G 11/46* (2013.01); *B82Y 40/00* (2013.01); *C01P 2002/72* (2013.01); *C01P 2002/82* (2013.01); *C01P 2002/88* (2013.01); *C01P 2004/04* (2013.01); *C01P 2004/16* (2013.01); *Y02E 60/13* (2013.01)

(58) Field of Classification Search
CPC .... B01J 35/006; B01J 35/0013; B01J 35/002; B01J 37/031; B01J 23/00; B01J 23/34; B01J 23/32; H01G 11/46; B82Y 40/00; B82Y 30/00; Y02E 60/12; C01G 45/02; C01G 45/1221; C01G 2002/72; C01G 2002/82; C01G 2002/88; C01G 2004/04; C01G 2004/16
See application file for complete search history.

(56) References Cited

U.S. PATENT DOCUMENTS 7,842,641 B2 * 11/2010 Fu et al. .................. 502/242
2004/0241427 A1 * 12/2004 Zhu et al. ................. 428/328
(Continued)

OTHER PUBLICATIONS

Olmos et al (NPL: One step synthesis of Mn3O4 nanoparticles structural and magnetic study, Journal of Colloid and Interface Science 291 (2005), pp. 175-180).*

(Continued)

*Primary Examiner* — Melvin C Mayes
*Assistant Examiner* — Smita Patel
(74) *Attorney, Agent, or Firm* — Swanson & Bratschun, L.L.C.

(57) ABSTRACT

A method of preparing one-dimensional trimanganese tetroxide ($Mn_3O_4$) nanoparticles from an exfoliated two-dimensional manganese dioxide ($MnO_2$) nanosheet using a solid-state decomposition method, and $Mn_3O_4$ nanoparticles prepared according to the method are provided. The $Mn_3O_4$ nanoparticles can be prepared at a very low temperature without using an organic solvent or a chemical additive, compared to conventional synthesis methods.

4 Claims, 5 Drawing Sheets

(51) Int. Cl.
*H01G 11/46* (2013.01)
*B82Y 40/00* (2011.01)

(56) References Cited

U.S. PATENT DOCUMENTS

2007/0202334 A1* 8/2007 Xie et al. ............... 428/402
2012/0041246 A1* 2/2012 Scher et al. ............ 585/500

OTHER PUBLICATIONS

Lee et al., "Low-Temperature Fabrication of $Mn_3O_4$ Nanorods by Solid-State Decomposition of Exfoliated $Mn_2$ Nanosheets", 16$^{th}$ International Symposium on Intercalation Compounds on May 23-26, 2011 (abstract).
Lee, Master's Degree Thesis, available on Aug. 1, 2011 (abstract).

* cited by examiner

METHOD FOR MN$_3$O$_4$ NANOPARTICLES BY SOLID-STATE DECOMPOSITION OF EXFOLIATED MNO$_2$ NANOSHEET

CROSS-REFERENCE TO RELATED APPLICATION

This application claims priority to and the benefit of Korean Patent Application No. 2011-0111230, filed Oct. 28, 2011, the disclosure of which is incorporated herein by reference in its entirety.

BACKGROUND

1. Field of the Invention

The present invention relates to a method of preparing trimanganese tetroxide (Mn$_3$O$_4$) nanoparticles from an exfoliated manganese dioxide (MnO$_2$) nanosheet using a solid-state decomposition method, and Mn$_3$O$_4$ nanoparticles preparing according to the method.

2. Discussion of Related Art

In general, Mn$_3$O$_4$ powder is prepared by reduction of MnO$_2$ or MnOOH or oxidation of Mn(OH)$_2$. In the reduction process, Mn$_3$O$_4$ can be obtained by reducing a manganese oxide using a method of heating a manganese oxide such as Mn$_2$O$_3$, MnO$_2$ or MnOOH in a kiln using methane gas as a reducing agent. When this process is applied, the heat treatment is carried out at 250° C. to 550° C. so as to prevent generation of MnO by excessive reduction. A method of yielding Mn$_3$O$_4$ powder using this process has an advantage in that the process is very simple. However, the method has problems in that it is difficult to prepare Mn$_3$O$_4$ powder in high purity since MnO is generated as impurities due to the excessive reduction during the heat treatment, and the reactivity is poor when used as a source material for preparing ferrite since a surface area of powder prepared by sintering Mn$_3$O$_4$ at a high temperature increases with an increasing particle size of the powder.

Another method of preparing a high-purity Mn$_3$O$_4$ powder includes a method of oxidizing a manganese metal powder in a pressurized reactor while the powder is dispersed in water. In this case, the method generally has advantages in that the reaction time is short, the prepared powder has high purity, and its particles are small and uniform in diameter. However, the method has problems in that the instrument is expensive, and it is uneconomic due to excessive use of energy since it requires high temperature and voltage.

Also, there is a method of preparing Mn$_3$O$_4$ which includes adding an alkaline solution such as an ammonia solution to an aqueous manganese sulfate solution to generate manganese hydroxide and adding an oxidizing agent to the manganese hydroxide. This method has an advantage in that the prepared Mn$_3$O$_4$ has a small particle diameter, but has problems in that wastewater containing sulfuric acid ions exuded from manganese sulfate is formed during the preparation of the Mn$_3$O$_4$, and thus it requires an additional process of disposing of the wastewater, and the sulfuric acid ions remaining in the Mn$_3$O$_4$ degrade product qualities as a magnetic material, and thus it requires an additional washing process to remove the sulfuric acid ions.

In recent years, a method of preparing Mn$_3$O$_4$ powder, which includes dispersing a metal manganese powder in an aqueous solution together with an ammonium salt selected from NH$_4$Cl, NH$_4$Br, NH$_4$I, NH$_4$NO$_3$ and (NH$_4$)$_2$SO$_4$ and introducing oxygen or an oxygen-containing gas as an oxidizing agent into the aqueous solution while heating the resulting mixture, has been known in the art. This method has problems regarding the corrosion of a reaction container by negative ions (Cl—, Br—, I—, NO$_3$—, (SO$_4$)$_2$—, etc.) included in the ammonium salt, the wastewater disposal for removing negative ions, and the washing process used to prevent the negative ions from remaining in the final product, Mn$_3$O$_4$. Also, the method has problems in that the metal manganese powder may be condensed into lumps during the reaction as the sudden reaction is carried out on a surface of the metal manganese powder, and the purity of the condensed lumps of the metal manganese powder may be lowered due to insufficient oxidation of the metal manganese powder.

SUMMARY OF THE INVENTION

Therefore, the present inventors have found a method of synthesizing a metal oxide even at a low temperature without using a harmful solvent or additive.

The present invention is directed to providing a method of preparing a one-dimensional metal oxide from an exfoliated two-dimensional metal oxide using a solid-state decomposition method.

One aspect of the present invention provides a method of preparing metal oxide nanoparticles. Here, the method includes:

(a) adjusting pH of an exfoliated metal oxide solution;

(b) separating and drying the precipitate obtained in operation (a); and (c) calcining the resulting product of operation (b), followed by subjecting the calcined product to solid-state decomposition.

Another aspect of the present invention provides metal oxide nanoparticles prepared according to the method and the use thereof.

BRIEF DESCRIPTION OF THE DRAWINGS

The above and other objects, features and advantages of the present invention will become more apparent to those of ordinary skill in the art by describing in detail exemplary embodiments thereof with reference to the attached drawings, in which.

DETAILED DESCRIPTION OF EXEMPLARY EMBODIMENTS

Figure 1:
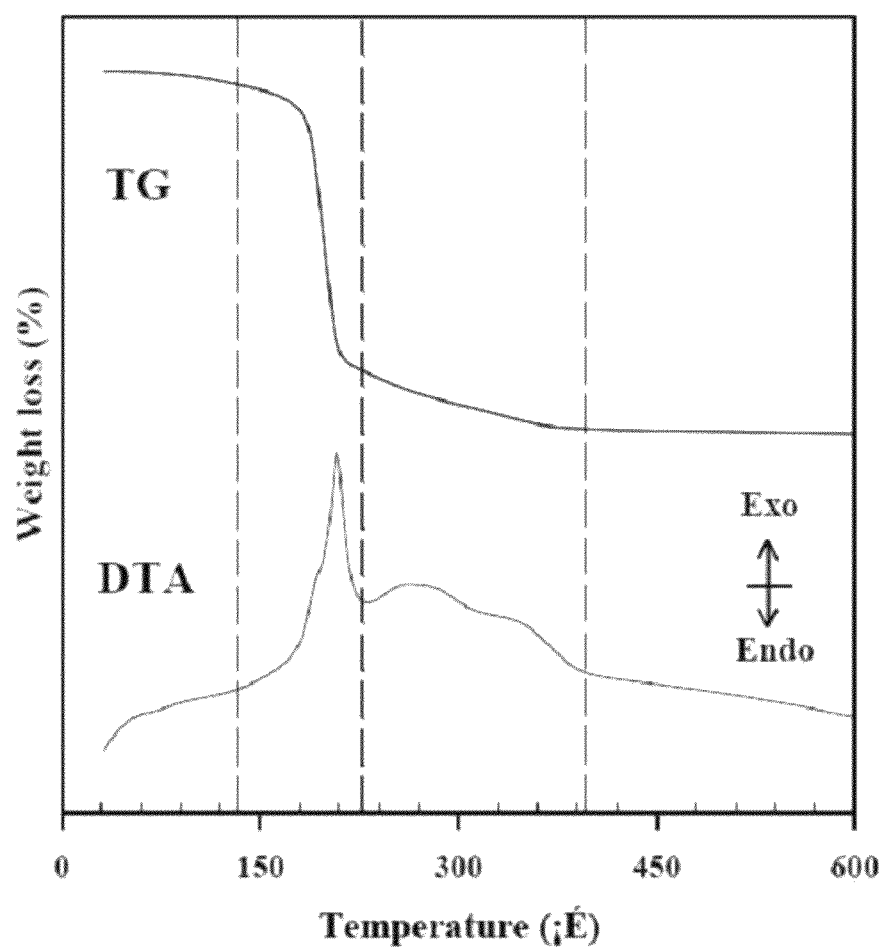
FIG. 1 shows the curves of TG and DTA in a sample.

Hereinafter, exemplary embodiments of the present invention will be described in detail. However, the present invention is not limited to the embodiments disclosed below, but can be implemented in various forms. The following embodiments are described in order to enable those of ordinary skill in the art to embody and practice the present invention.

Although the terms first, second, etc. may be used to describe various elements, these elements are not limited by these terms. These terms are only used to distinguish one element from another. For example, a first element could be termed a second element, and, similarly, a second element could be termed a first element, without departing from the scope of exemplary embodiments. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting of exemplary embodiments. The singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, components and/or groups thereof, but do not preclude the presence or addition of one or more other features, integers, steps, operations, elements, components and/or groups thereof.

With reference to the appended drawings, exemplary embodiments of the present invention will be described in detail below. To aid in understanding the present invention, like numbers refer to like elements throughout the description of the figures, and the description of the same elements will be not reiterated.

The present invention is directed to provide a method of preparing metal oxide nanoparticles. Here, the method includes:

(a) adjusting pH of an exfoliated metal oxide solution;
(b) separating and drying the precipitate obtained in operation (a); and
(c) calcining the resulting product of operation (b), followed by subjecting the calcined product to solid-state decomposition.

The metal oxide may be manganese oxide, titanium oxide, cobalt oxide or nickel oxide, but the present invention is not limited thereto.

For example, when the metal oxide is manganese oxide, a layered $MnO_2$ nano-material may prepared by mixing potassium carbonate ($K_2CO_3$) and manganese sesquioxide ($Mn_2O_3$) at a predetermined stoichiometric ratio and calcining the resulting mixture at a high temperature to prepare layered $MnO_2$ having potassium ions intercalated into layers thereof. Subsequently, the $MnO_2$ having hydrogen ions intercalated thereinto, which may be readily used for an exfoliation process, may be prepared by replacing interlayer potassium ions with hydrogen ions using hydrochloric acid. Thereafter, the exfoliation of the layered $MnO_2$ is performed by introducing a bulky hydroxide compound such as tetrabutylammonium hydroxide (TBAOH) into the $MnO_2$ having hydrogen ions intercalated into layers thereof. Tetrabutylammonium positive ions may be replaced into layers more easily due to an acid-base reaction between OH— ions and hydrogen ions present between the layers. As a result, a nanosheet shape may be induced due to a decrease in attraction between layered sheets.

The adjustment of pH may be performed by adding an acid solution to the exfoliated $MnO_2$ solution. Here, the acid solution may include a hydrochloric acid solution, a sulfuric acid solution, a nitric acid solution, and an acetic acid solution. The hydrochloric acid solution may be added to prepare a one-dimensional metal oxide. Also, the pH may be adjusted to 2 to 8, and the condensation may be caused during the reaction while adjusting the acidity.

Operation (b) is to separate and dry the precipitate obtained in operation (a). A reactant that starts to precipitate due to the condensation may be stirred for 0.5 to 3 hours to induce a homogenous reaction, and then dried at room temperature.

Operation (c) is to calcine the resulting product of operation (b), followed by subjecting the calcined product to solid-state decomposition. Finally, one-dimensional metal oxide nanoparticles may be formed by calcining the powdery material obtained by the drying at a temperature of 150 to 400° C. for 1 to 3 hours. In operation (c), the calcination may be performed at a low temperature without using an organic solvent or an additive.

Also, the present invention is directed to providing one-dimensional metal oxide nanoparticles prepared according to the method. The metal oxide may be $Mn_3O_4$.

When the nanoparticles are $Mn_3O_4$, the $Mn_3O_4$ may be an inexpensive and effective catalyst that functions to decompose NOx, and may be used as a material that is useful in cleaning the atmospheric environment. In addition, the $Mn_3O_4$ may be used as a precursor material to synthesize a magnetic material such as manganese zinc ferrite. Also, the $Mn_3O_4$ may be used as a positive electrode material for supercapacitors.

Hereinafter, the present invention will be described with reference to Examples for better understanding of the present invention. However, it should be understood that the description proposed herein is merely a preferable example for the purpose of illustration only, not intended to limit the scope of the invention. Therefore, the Examples of the present invention are provided to more completely explain the present invention to persons of ordinary skill in the art.

Examples 1

Preparation of $Mn_3O_4$ Nanoparticles

1. Preparation of Layered $MnO_2$ Nano-Material

Layered $K_{0.5}MnO_2$ commercially available from Sigma Aldrich was prepared by heating a stoichiometric mixture of potassium carbonate ($K_2CO_3$) and manganese sesquioxide ($Mn_2O_3$) at 800° C. for 30 hours. The obtained XRD data of the manganese sesquioxide ($Mn_2O_3$) product was substantially identical to the values of the $K_{0.47}Mn_{0.94}O_2$ reported in the prior-art document. The manganese oxide having hydrogen ions intercalated thereinto was obtained by reacting a $K_{0.5}MnO_2$ powder in a 1M HCl aqueous solution while stirring at room temperature for 10 days. During a proton exchange reaction, the HCl solution may be recycled every day so as to facilitate introduction of protons. The resulting product was washed, and dried at room temperature in the air to form a manganese oxide having hydrogen ions intercalated thereinto, which included a component of $H_{0.13}MnO_2 \cdot 0.7H_2O$.

2. Exfoliation of Layered $MnO_2$ Nanosheet

A colloidal suspension of an exfoliated $MnO_2$ nanosheet was prepared by stirring $H_{0.13}MnO_2 \cdot 0.7H_2O$ (0.4 g) in 100 ml of a $(C_4H_9)_4NOH$ solution (5.2 mmol) at room temperature. The suspension was stirred for 10 days, and an unexfoliated component was separated by centrifugation at 10,000 rpm for 10 minutes so as to obtain a colloidal suspension containing a highly dispersed exfoliated $MnO_2$ nanosheet.

3. Preparation of $Mn_3O_4$ Nanoparticles Using Solid-State Decomposition Method The condensed product was collected by centrifugation (at 8,000 rpm for 10 minutes), washed with distilled water, and dried at room temperature. The resulting sample was heated at various temperatures (100, 150, 200, 300 and 400° C.) for 2 hours to form $Mn_3O_4$ nanoparticles.

Experiment Example 1

A 1 M hydrochloric acid solution was added to 100 mL of an aqueous solution, which was obtained by dispersing approximately 0.2 g of an exfoliated $MnO_2$ nanosheet, while stirring. In this case, acidity (pH) of the aqueous solution was adjusted to 6 by measuring a real-time change in pH during the reaction using an acidity (pH) measuring instrument. Thereafter, when the reactant started to be condensed, the resulting mixture was stirred for 2 hours, and centrifuged to separate a precipitate. Then, the precipitate was dried at room temperature. The dried powdery reactant was calcined at a temperature of 250° C. for 2 hours to prepare final one-dimensional $Mn_3O_4$ nanoparticles.

Experiment Example 2

One-dimensional $Mn_3O_4$ nanoparticles were prepared in the same manner as in Experiment Example 1, except that the acidity of the aqueous solution was adjusted to 4.

Experiment Example 3

One-dimensional $Mn_3O_4$ nanoparticles were prepared in the same manner as in Experiment Example 2, except that the dried powdery reactant was calcined at a temperature of 300° C. for 2 hours.

Experiment Example 4

One-dimensional $Mn_3O_4$ nanoparticles were prepared in the same manner as in Experiment Example 2, except that the dried powdery reactant was calcined at a temperature of 350° C. for 2 hours.

Experiment Example 5

One-dimensional $Mn_3O_4$ nanoparticles were prepared in the same manner as in Experiment Example 2, except that the dried powdery reactant was calcined at a temperature of 400° C. for 2 hours.

Experiment Example 6

One-dimensional $Mn_3O_4$ nanoparticles were prepared in the same manner as in Experiment Example 2, except that the dried powdery reactant was calcined at a temperature of 200° C. for 2 hours.

Experiment Example 7

One-dimensional $Mn_3O_4$ nanoparticles were prepared in the same manner as in Experiment Example 2, except that the dried powdery reactant was calcined at a temperature of 150° C. for 2 hours.

Examples 2

Analysis of $MnO_2$ and $Mn_3O_4$

1. Characteristics of $MnO_2$ and $Mn_3O_4$

The powder X-ray diffractions (XRD) of the crystal structures of the layered $MnO_2$ as a starting material and the $Mn_3O_4$ nanoparticles as a resulting product were measured using a graphite diffracted beam monochromator (Cu Kα radiation ($\lambda$)=1.540598 A). The patterns were determined at an operating voltage of 40 kV and an electric current of 20 mA. The phase purities were determined using a KBr disk method by a Varian FTS 800 Fourier transform infrared (FT-IR) spectrometer. The ingredients of the sample were measured using an element analyzer (Thermo Electron Corporation, Flash EA 1112). The thermal analyzer (TG-DTA; Rigaku TAS-100) was used to check thermal behaviors of a sample, which was prepared at a heating rate of 10° C./min in a temperature range from room temperature to 900° C. The morphological characteristics of the sample were measured using a high-resolution transmission electron microscope (Tecnai G2 F30, 300 kV) and a field-emission scanning electron microscope (JEOL, JSM-6700F).

2. Element Analysis

The TBA-intercalated $MnO_2$ and the chemical ingredient of the prepared sample were analyzed by assuming an amount of the intercalated TBA positive ions using CHNS analysis. In the CHNS analysis, the nitrogen (N) content was of importance since N was solely derived from compositions of the TBA positive ions. As listed in the following Table 1, the TBA-intercalated $MnO_2$ and the ingredient of the prepared sample were determined to be $TBA_{0.11}MnO_2.0.2H_2O$ and $H_{0.072}TBA_{0.058}MnO_2.0.29H_2O$, respectively. This indicates that the TBA positive ions present between $MnO_2$ layers were partly exchanged with protons during a pH adjustment process. The lattice parameters, symmetries and chemical ingredients of the layered $MnO_2$, the prepared sample and the resulting product, $Mn_3O_4$, are listed in the following Table 1.

TABLE 1

| Samples | a (Å) | b (Å) | c (Å) | Symmetry | Chemical formula |
|---|---|---|---|---|---|
| Layered potassium manganate | 4.840 | 4.840 | 6.922 | hexagonal | $K_{0.5}MnO_2$ |
| Layered protonic manganate | 4.913 | 4.913 | 7.262 | hexagonal | $H_{0.13}MnO_2.0.7H_2O$ |
| TBA-intercalated manganate[a] | — | — | 12.415 | — | $TBA_{0.11}MnO_2.0.2H_2O$ |
| As-prepared (adjusted to pH 6)[b] | — | — | — | — | $H_{0.072}TBA_{0.058}MnO_2.0.29H_2O$ |
| $Mn_3O_4$ nanorods | 5.771 | — | 9.429 | tetragonal | $Mn_3O_4$ |

[a]Tetrabutylammonium-intercalated layered manganate, which was obtained by centrifugation (10000 rpm) of exfoliated manganate solution.
[b]The pH condition is determined by scanning emission microscopy analysis (Supplementary data, S1)

3. Thermal Analysis

The TG and DTA curves of the prepared sample are shown in FIG. 1. The 3-step weight loss was observed on the TG curve. In the DTA curve, the first weight loss (1.8 wt %) generated under 130° C. together with a very weak endothermic peak was due to dehydration of water absorbed from a surface of the sample. The second large weight loss (38.9 wt %) was due to strong generation of heat, which corresponded to oxidative decomposition of the TBA positive ions in an interlayer space of the layered $MnO_2$ at a temperature of 130 to 230° C. The third weak weight loss (7.4 wt %) at 230 to 400° C. was due to formation of divalent atoms accompanied with reduction of $MnO_2$ from tetravalent atoms to trivalent atoms and emission of oxygen. From these results, a proper heating temperature was proposed to be approximately 300° C. so as to supply the layered $MnO_2$ in a completely phase-changed state and completely remove incinerated organic moieties in the interlayer space. Also, this was confirmed through FT-IR measurement.

4. Powder X-Ray Diffraction Analysis

Figure 2:
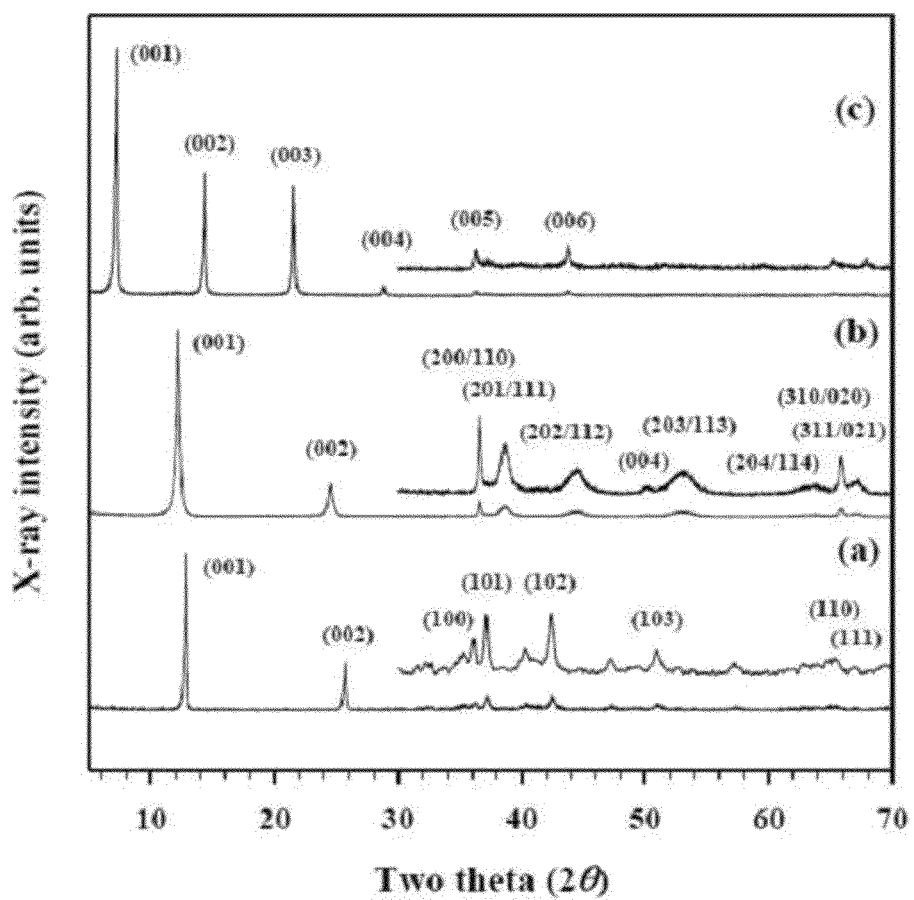
FIG. 2 shows the X-ray diffraction patterns of host-layered materials: (a) K$_{0.5}$MnO$_2$, (b) H$_{0.13}$MnO$_2$.0.7H$_2$O and (c) TBA$_{0.11}$MnO$_2$.0.2H$_2$O.

An XRD pattern of the manganese oxide having layered potassium and hydrogen ions intercalated thereinto represents a birnessite structure. The original $K_{0.5}MnO_2$ powder XRD pattern is shown in FIG. 2(a), and the protons- and TBA-exchange patterns are also shown in FIGS. 2(b) and (c). All the original diffraction peaks of $K_{0.5}MnO_2$ may be indexed as a hexagonal structure having purified unit cell parameters: a=4.840 A and c=6.922 A. After the proton exchange reaction, all the diffraction peaks may be indexed based on the original hexagonal unit cell having purified lattice parameters: a=4.913 A and c=7.262 A, which are substantially identical to those of known quantum-layered $MnO_2$. It was revealed that the (001) refraction of layered manganate moved toward a smaller angle during the acid treatment, and the lattice expansion was induced by injection of water molecules into the interlayer space of the manganese oxide having hydrogen ions intercalated thereinto (see Table 1). From the injection of the TBA positive ions into the layered $MnO_2$, it was seen that the well-defined (001) refraction was observed in a small angle region, and an underlying distance was assumed to be 12.415 A, which indicates that the large TBA positive ions expanded toward the c-axis by approximately 7.215 A.

Figure 3:
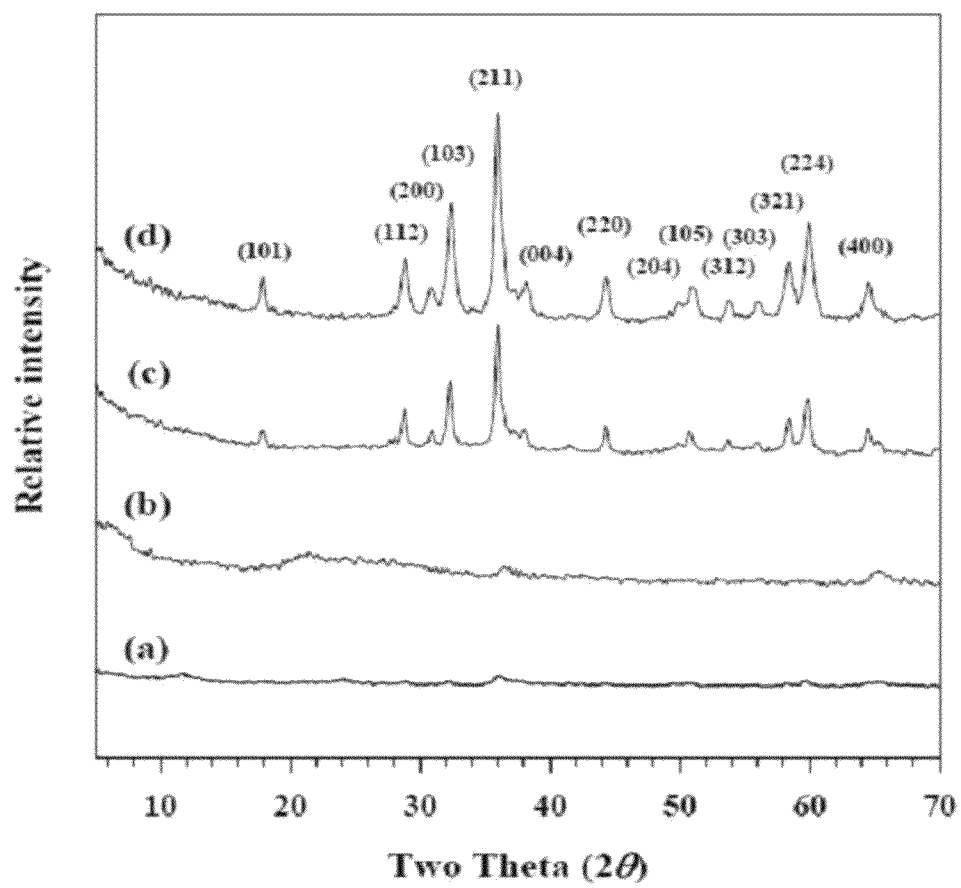
FIG. 3 shows the X-ray diffraction patterns of a sample at various temperatures: (a) a reference temperature, (b) 100° C., (c) 150° C. and (d) 300° C.

FIG. 3 shows the XRD patterns of a sample after heat treatment at various temperatures: (a) a reference temperature, (b) 100° C., (c) 150° C. and 300° C. As shown in FIG. 3(a), the sample had a weak and wide 001 diffraction pattern, which was mainly due to random orientation of the intercalated TBA positive ions formed due to the intercalation of protons. During the heat treatment, these X-ray patterns were changed into an amorphous state at 100° C. (FIG. 3(b)), and a $Mn_3O_4$ crystal peak having a hausmannite structure (FIG. 3(c)) was formed at 150° C. A plane corresponded to the following coordinates: (112), (103), (211), (321) and (224), and the calculated lattice constants, a=b=5.771 A and c=9.429 A, (see Table 1) were substantially identical to those of JCPDS 24-0734: a=b=5.7621 A and c=9.4696 A, and represented the formation of a $Mn_3O_4$ compound. Attention was paid to the fact that the phase change of manganese oxide hausmannite in the layered $MnO_2$ could be achieved even at 150° C. On the other hand, the protons- and TBA-exchanged layered $MnO_2$ ($H_{0.13}MnO_2 \cdot 0.7H_2O$ and $TBA_{0.11}MnO_2 \cdot 0.2H_2O$) was not converted into $Mn_3O_4$ within the temperature region. After the heat treatment, the diffraction pattern increased due to crystallization of $Mn_3O_4$.

5. FT-IR Analysis

Figure 4:
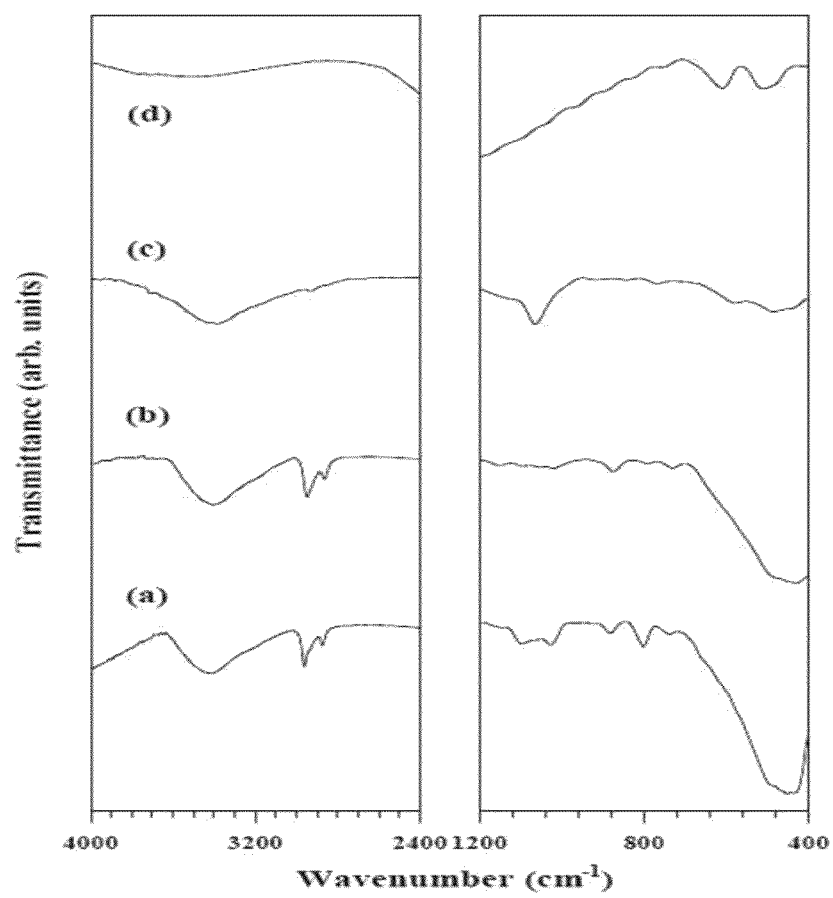
FIG. 4 shows the Fourier transform infrared spectra of a sample at various temperatures: (a) a reference temperature, (b) 100° C., (c) 150° C. and (d) 300° C.

FIG. 4 shows the FT-IR spectrum of a sample that is heat-treated at a reference temperature, 100° C., 150° C. and 300° C. Bands at approximately 2,950 and 2,870 $cm^{-1}$ indicated the presence of the TBA molecule in layers and were due to asymmetric and symmetric aliphatic C—H stretching vibrations. Except for the spectrum of a sample heat-treated at 300° C., all the spectra showed wide and intense bands at the center of approximately 3,420 $cm^{-1}$, which corresponded to O—H stretching vibrations of hydroxyl groups of the water molecules present in the layers. Specific bands at 499 $cm^{-1}$ and 440 $cm^{-1}$ shown in FIGS. 4(a) and (b) were due to an asymmetric stretching mode of $MnO_6$ octahedrons in birnessite manganate, which corresponded to the XRD analysis. An absorption peak at approximately 1,067 $cm^{-1}$ shown in FIG. 4(c) might be due to O—H bending vibrations bind to manganese atoms. Wide absorption bands at approximately 610, 510 and 480 $cm^{-1}$ shown in FIGS. 4(c) and (d) were associated with a tetrahedral Mn-0 stretching mode and the connection between octahedral portions in the $Mn_3O_4$ spinel structure. This indicates that the phase change from birnessite manganate into $Mn_3O_4$ hausmannite can be achieved even at 150° C.

6. Transmission Electron Microscopic Analysis

Figure 5:
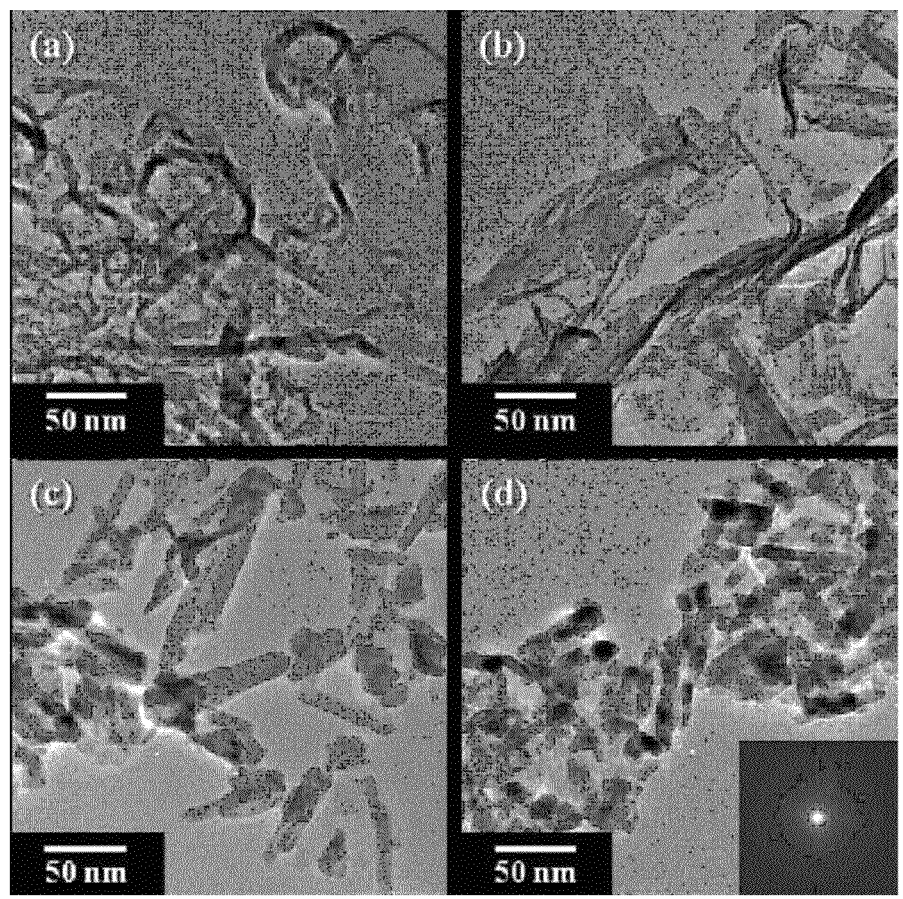
FIG. 5 shows the HR-TEM images of a sample at various temperatures: (a) a reference temperature, (b) 100° C., (c) 150° C. and (d) 300° C.

FIG. 5 shows the HR-TEM images of a sample that is heat-treated at various temperatures: (a) a reference temperature, (b) 100° C., (c) 150° C. and (d) 300° C. The sample prepared at 100° C. and the heat-treated samples were all typically shown as the exfoliated layered materials. In the case of the prepared sample, corners of the layers were rounded due to hydrophobic interaction between injected TBA protons. Nanoparticles (i) having a diameter of 10 to 15 nm and a length of 50 to 100 nm and irregular thin sheet-type fragments were observed in the sample heat-treated at 150° C. When the temperature increased to 300° C., the nanoparticles had a short length of 30 to 50 nm and a similar diameter.

While the invention has been shown and described with reference to certain exemplary embodiments thereof, it will be understood by those skilled in the art that various changes in form and details may be made therein without departing from the scope of the invention as defined by the appended claims.

What is claimed is:

1. A method of preparing metal oxide nanoparticles, comprising:
   (a) adjusting pH of an exfoliated metal oxide solution comprising manganese oxide or trimanganese tetroxide (Mn3O4);
   (b) separating and drying the precipitate obtained in operation (a); and
   (c) calcining the resulting product of operation (b).
2. The method of claim 1, wherein the adjustment of pH in operation (a) is performed by adding an acid solution.
3. The method of claim 1, wherein the pH in operation (a) is adjusted to 2 to 8.
4. The method of claim 1, wherein operation (c) is performed at 150 to 400° C.

* * * * *